(12) United States Patent
Wood

(10) Patent No.: US 7,341,024 B2
(45) Date of Patent: Mar. 11, 2008

(54) APPARATUS, METHOD AND BUSINESS METHODS FOR PROCESSING ANIMAL WASTE IN A FARM BUILDING

(75) Inventor: James L. Wood, Granby, MO (US)

(73) Assignee: Green-L, Inc., Granby, MO (US)

( * ) Notice: Subject to any disclaimer, the term of this patent is extended or adjusted under 35 U.S.C. 154(b) by 0 days.

(21) Appl. No.: 10/819,407

(22) Filed: Apr. 7, 2004

(65) Prior Publication Data

US 2004/0200428 A1    Oct. 14, 2004

Related U.S. Application Data

(63) Continuation-in-part of application No. 10/199,624, filed on Jul. 19, 2002, now abandoned.

(51) Int. Cl.
*A01K 1/01* (2006.01)

(52) U.S. Cl. ........................................ 119/451; 119/416

(58) Field of Classification Search ................ 119/451, 119/442, 447, 479, 436, 437, 445, 171, 28.5, 119/450, 867, 161, 174, 416
See application file for complete search history.

(56) References Cited

U.S. PATENT DOCUMENTS 1,774,326 A * 8/1930 Holmes et al. ................ 15/77
3,881,707 A * 5/1975 Toto ..................... 241/101.742

(Continued)

FOREIGN PATENT DOCUMENTS

FR              2531602 A  *  2/1984

(Continued)

OTHER PUBLICATIONS

Tadtiyanant et al., "Extrusion Processing Used to Convert Dead Poultry, Feathers, Eggshells, Hatcher Waste, and Mechanically Deboned Residue into Feedstuffs for Poultry", 1993 Poultry Science 72, pp. 1515-1527 (1993).

(Continued)

*Primary Examiner*—Son T. Nguyen
(74) *Attorney, Agent, or Firm*—Martin & Associates, LLC; Derek P. Martin

(57) ABSTRACT

A mobile apparatus is used to process animal waste in a farm building and to spread the processed animal waste back on the floor of the farm building as the apparatus moves through the farm building. The apparatus includes a processing mechanism that heats the animal waste to a predetermined temperature to eliminate insects, bacteria, and ammonia from the animal waste. The apparatus also includes a spreader mechanism for distributing the processed animal waste onto the farm building floor. The apparatus may optionally include a pickup mechanism that picks up the animal waste off of the farm building floor and directs the animal waste to the processing mechanism. The most preferred implementation of the apparatus is a single-pass machine that takes in animal waste in the front using a pickup mechanism, processes the animal waste to sanitize the animal waste, and spreads the sanitized animal waste in the rear, allowing the operator to move the machine through the farm building and thereby sanitize all of the animal waste in a single pass.

4 Claims, 12 Drawing Sheets

U.S. PATENT DOCUMENTS

| | | | | | |
|---|---|---|---|---|---|
| 4,067,297 | A | * | 1/1978 | Johnson | 119/447 |
| 4,205,624 | A | * | 6/1980 | Yacus | 119/174 |
| 4,708,294 | A | * | 11/1987 | Endom | 241/27 |
| 4,867,381 | A | * | 9/1989 | Speicher | 239/665 |
| 5,195,465 | A | * | 3/1993 | Webb et al. | 119/17 |
| 5,294,064 | A | * | 3/1994 | Faccia | 241/101.74 |
| 5,865,143 | A | * | 2/1999 | Moore, Jr. | 119/442 |
| 6,182,610 | B1 | * | 2/2001 | Tripp et al. | 119/450 |
| 6,439,164 | B1 | * | 8/2002 | Notenbomer | 119/447 |
| 6,810,832 | B2 | * | 11/2004 | Ford | 119/437 |
| 2002/0130207 | A1 | * | 9/2002 | van den Berg | 239/654 |

FOREIGN PATENT DOCUMENTS

| | | | | |
|---|---|---|---|---|
| JP | 406078642 | A | * | 3/1994 |
| SU | 1803006 | A1 | * | 3/1993 |

OTHER PUBLICATIONS

Haque et al., "Extrusion Processing of Broiler Starter Diets Containing Ground Whole Hens, Poultry By-Product Meal, Feather Meal, or Ground Feathers", 1991 Poultry Science 70, pp. 234-240 (1991).

"The Dry Extrusion Process", Insta-Pro International brochure.

"Insta-Pro Model 2500 Extruder", Insta-Pro International brochure.

"Insta-Pro Model 9800 Extruder", Insta-Pro International brochure.

Said et al., "Extrusion Processing of Ingredients and Feed", Insta-Pro International brochure (1995).

"Microbiologic Evaluation of Dead Bird Meal", Insta-Pro International brochure.

Froning et al., "Utilization of Inedible Eggshells and Technical Egg White Using Extrusion Technology", Insta-Pro International brochure (1989).

Tadtiyanant et al., "Extrusion Processing Used to Convert Egg Shells, Hatchery Waste and Deboning Residuals into Feedstuffs for Laying Hens", Insta-Pro International brochure (1991).

Blake et al., "Extruding Poultry Farm Mortalities", Insta-Pro International brochure (1991).

Patterson et al., "Feeding Value of Poultry By-Products Coextruded with Cassava, Barley and Wheat Middlings for Broiler Chicks: The Effect of Ensiling Poultry By-products as a Preservation Method Prior to Coextrusion", Insta-Pro International brochure.

Tadtiyanant et al., "Utilization of Extruded Poultry Mortalities and Feathers in Broiler Starter Diets", Insta-Pro International brochure.

Haque et al., "Utilization of Ground Whole Hens in Broiler Diets", Insta-Pro International brochure (1987).

Blake et al., "Dry Extrusion of Offal, Feathers, and Dead Birds", Insta-Pro International brochure.

Murphy et al., "Preservation of and Nutrient Recover from Poultry Carcasses Subjected to Lactic Acid Bacteria Fermentation", Insta-Pro International brochure.

"Feed from Poultry Waste—A New Process", Insta-Pro Intertnational brochure.

Said, "Dry Extrusion—A Solution to Wet Waste Problems", Insta-Pro International brochure.

UCDAVIS, "How much can they take?", http://www.vetmed.ucdavis.edu/vetext/INF-PO_Forum/howmuch.htm (Jul. 14, 2002).

AGRIRECYCLE, "What Does AgriRecycle Offer?", http://www.agrirecycle.com/agrirecycleoffers.htm (Jul. 14, 2002).

AGRIRECYCLE, "Environmental Benefits of an AgriRecycle Manure Plant", http://www.agrirecycle.com/environmentalbenefits.htm (Jul. 14, 2002).

AGRIRECYCLE home page, http://www.agrirecycle.com/frontpage.htm (Jul. 14, 2002).

AGRIRECYCLE, "Let AgriRecycle Turn Your Poultry Litter into a Usable Fertilizer!", http://www.agrirecycle.com/agribenefits.htm (Jul. 14, 2002).

AGRIRECYCLE photo gallery, http://www.agrirecycle.com/photogallery.htm (Jul. 14, 2002).

Carper Kicks Off Opening of Perdue AgriRecycle Plant, http://carper.senate.gov/~car[er[ress/01/07/2001718532.html(Jul. 14, 2002).

Web page, www.insta-pro.com/waste.htm "Insta-Pro Extrusion Recycling Systems for By-Products" (Dec. 4, 2002).

* cited by examiner

APPARATUS, METHOD AND BUSINESS METHODS FOR PROCESSING ANIMAL WASTE IN A FARM BUILDING

RELATED APPLICATION

This patent application is a continuation-in-part of my patent application, "METHOD FOR PROCESSING AND RECYCLING ANIMAL WASTE AND METHOD FOR DOING BUSINESS USING THE SAME", Ser. No. 10/199,624 filed on Jul. 19, 2002, now abandoned which is incorporated herein by reference.

BACKGROUND OF THE INVENTION

1. Technical Field

This invention generally relates to the field of animal husbandry, and more specifically relates to an apparatus for processing soiled litter in a poultry house, a method for processing soiled litter in a poultry house, and a method for doing business using the apparatus and method.

2. Background Art

Commercial poultry operations provide the majority of poultry consumed in the United States. In most turkey and chicken operations, large buildings are used to house the birds as they grow to the desired weight. One aspect of using these buildings is the need to dispose of the excrement (or droppings) produced by the birds. Typically, clean litter is placed on the floor of a poultry house before chicks are delivered. Examples of known litter materials include organic materials such as sawdust, wood chips, and rice hulls, inorganic materials such as sand, and processed materials such as shredded newspaper. The birds leave their droppings on the litter. The litter absorbs most of the liquid content of the poultry waste, and adheres to the solids. Once the birds are removed from the poultry house, the clumped or caked portion of the soiled litter is typically removed from the poultry house and spread on farm land as a fertilizer. The rest of the soiled litter is typically left in the poultry house for the next flock.

While the birds grow, the bacteria and moisture in the droppings that is captured in the litter creates ammonia. Ammonia is a problem because excessive levels of ammonia may cause blindness in young chicks, may stunt their growth, and may decrease their resistance to disease. In addition, the presence of ammonia affects how efficiently the birds convert feed to body weight.

After removing the caked portion of litter after a flock is removed from the poultry house, the remaining litter is typically tilled several times, and the poultry house is then heated until the ammonia and moisture content of the poultry house drop to acceptable levels. This can take several days, with typical times of two weeks to air out a poultry house between flocks. Leaving poultry houses empty for two weeks or more at a time reduces the number of flocks a poultry farmer can raise due to the time that the poultry houses must sit empty to reduce the buildup of ammonia. In addition, high ammonia levels in poultry houses generate an unpleasant smell that is often complained of by neighbors.

Another problem with current poultry operations is the presence of darkling beetles in the litter. These beetles carry bacteria that can spread disease to the flock. Darkling beetles reside in the soiled litter in the poultry house, increasing the risk of spreading disease to the new flock because the beetle population is usually left unchecked.

Without a way to reduce the turnaround time for poultry houses, and for better addressing the problems of bacteria, moisture, ammonia, darkling beetles, and other pests, the poultry industry will continue to suffer undue losses associated with the drawbacks in the prior art discussed above.

DISCLOSURE OF INVENTION

According to the preferred embodiments, a mobile apparatus is used to process animal waste in a farm building and to spread the processed animal waste back on the floor of the farm building as the apparatus moves through the farm building. The apparatus includes a processing mechanism that heats the animal waste to a predetermined temperature to eliminate insects, bacteria, and ammonia from the animal waste. The apparatus also includes a spreader mechanism for distributing the processed animal waste onto the farm building floor. The apparatus may optionally include a pickup mechanism that picks up the animal waste off of the farm building floor and directs the animal waste to the processing mechanism. The most preferred implementation of the apparatus is a single-pass machine that takes in animal waste in the front using a pickup mechanism, processes the animal waste to sanitize the animal waste, and spreads the sanitized animal waste in the rear, allowing the operator to move the machine through the farm building and thereby sanitize all of the animal waste in a single pass.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments disclose methods for processing animal waste, and methods for doing business that include the processing of animal waste. The specific examples provided herein relate to poultry farming, but one skilled in the art will recognize that the methods herein are not limited to poultry applications.

Figure 1:
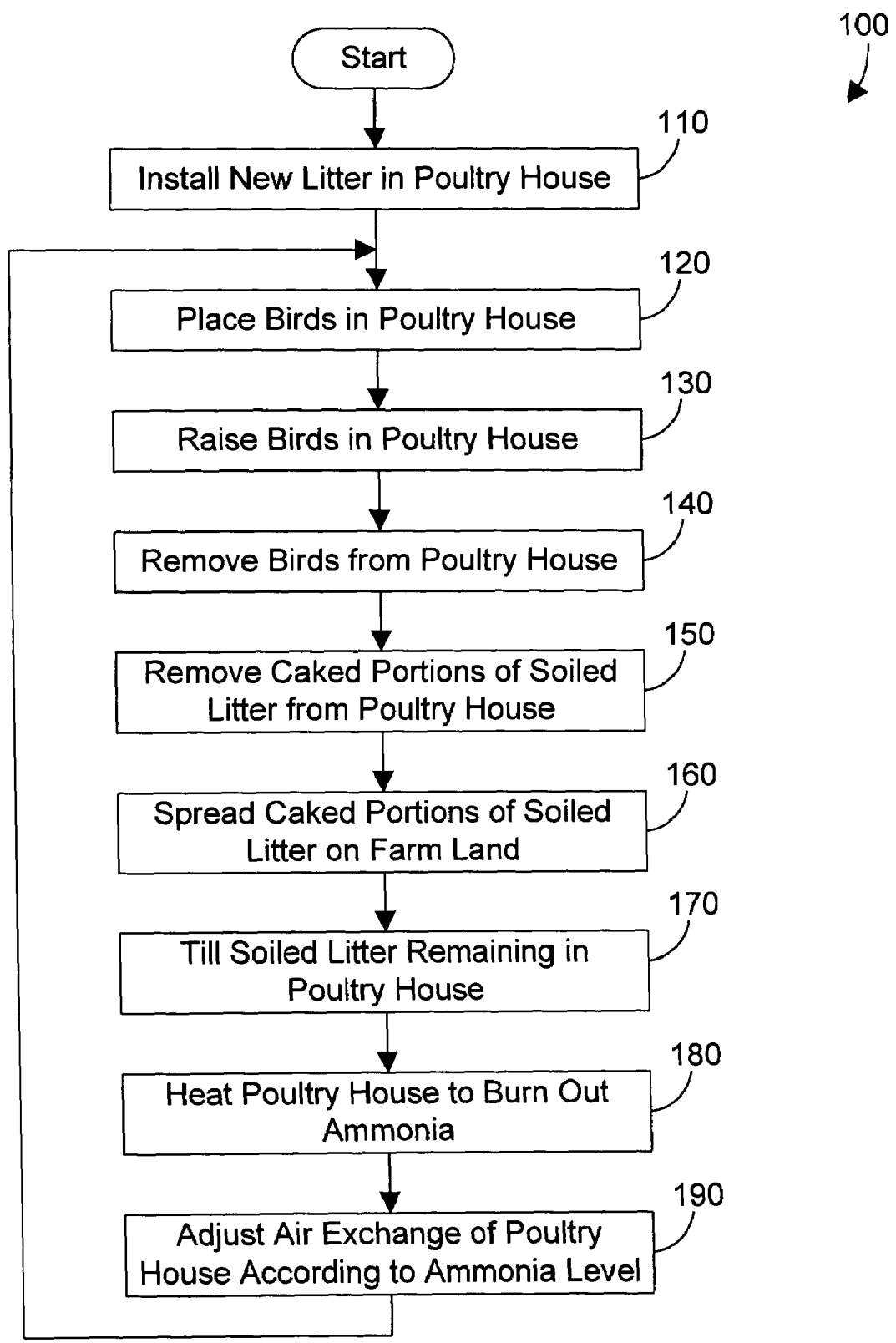
FIG. 1 is a flow diagram of a prior art method for operating a commercial poultry farm.

Referring now to FIG. 1, a prior art method 100 for raising birds in poultry houses begins by installing new litter in a poultry house (step 110). The term "litter" is used herein in its broadest possible sense, and expressly includes organic materials such as sawdust, wood chips, and rice hulls, inorganic materials such as sand, processed materials such as shredded newspaper, and any other material that causes animal excrement to form clumps, whether naturally-occurring, processed, or synthetic. We assume that step 110 is performed after a poultry house is constructed, or after an annual clean-out of the poultry house. Once litter is in place, birds are placed in the poultry house (step 120). The birds are then raised in the poultry house (step 130). The time required to raise the birds depends on the type of bird and desired weight of the birds. While the birds are being raised in step 130, they defecate (leave their droppings) on the litter. Once the birds are to the desired age or weight, they are removed from the poultry house (step 140). The birds are then typically trucked to a plant for processing.

With the birds removed from the poultry house, the poultry house must then be prepared for the next flock. A decaking machine is typically used to remove caked portions of the soiled litter from the poultry house (step 150). The removed caked portions are then spread on farm land (step 160). The litter remaining in the poultry house is tilled (step 170), and may be tilled a number of different times. Tilling the soiled litter allows it to air out, releasing the ammonia that builds up in the poultry house. To help to burn out the ammonia, the poultry house is typically heated (step 180). The amount of air exchange in the poultry house is adjusted by the farmer to get rid of the unwanted ammonia, and to keep the ammonia levels in the poultry house to acceptable levels (step 190). Method 100 then loops back to step 120, and the process is repeated for the next flock of birds.

The prior art method 100 described above suffers from several significant problems. First of all, the soiled litter removed from the poultry house must be disposed of. The most common way to dispose of the soiled litter is to spread the litter on farm land, as shown in step 160. Note, however, that soiled poultry litter is high in phosphates and nitrogen, which are considered as pollutants in excessive levels. As a result, the caked portions of the soiled litter cannot be spread just anywhere. In the future, land owners will likely have to meet Environmental Protection Agency (EPA) requirements before spreading litter, which involves soil testing prior to land application. Once the phosphate levels of nearby land exceed certain levels, the poultry farmer will face the cost of finding other land that is farther away to dispose of the soiled litter, which is not only a hassle but will also cost the farmer more to truck the soiled litter further distances.

Another significant problem with method 100 is that the decaked portions of the soiled litter (the litter that remains after the caked portions are removed) are reused for the next flock. Bacteria in the droppings multiply quickly in the litter, and generate ammonia. Ammonia in excessive levels can cause blindness in birds, can contribute to the mortality rate of birds, and negatively affects how the birds convert feed to body weight. For this reason, steps 170, 180 and 190 in method 100 of FIG. 1 are performed to manage the problem of ammonia buildup.

As the poultry house is heated in step 180, the ammonia is released from the remaining soiled litter. However, the increased heat also increases the rate at which the ammonia-generating bacteria multiply. Experience has shown that the ammonia is driven off faster than the increased bacteria can generate it. The result is a net decrease in ammonia levels, with the undesirable side effect of a net increase of ammonia-generating bacteria. The result is that ammonia levels become more and more difficult to maintain below desired levels with each additional flock.

In most poultry operations, step 180 of heating the poultry house to burn out the ammonia typically takes one or two days prior to placing a new flock in the poultry house. In cold weather, heating the poultry houses for one or two days when they do not contain birds is expensive. Even more significant is the down time that reduces the number of flocks that can be raised by a poultry farmer in a given year.

Even after new chicks are placed in the poultry house in step 120, the rate of air exchange is adjusted by the poultry farmer in an effort to maintain the level of ammonia below a harmful level. As the chicks mature, they can withstand greater levels of ammonia, so the air exchange rate may be reduced to accommodate the more mature birds.

Another problem that arises from reusing untreated soiled litter is insect infestation. In particular, darkling beetles are common insects found in poultry houses. These beetles carry bacteria and disease. It is common to treat a poultry house for beetles and other insects during an annual clean-out when all of the soiled litter is removed and replaced with new litter. In between flocks, however, when soiled litter is kept in the poultry house, treatment for beetles is rarely performed. As a result, the number of darkling beetles and other insects can increase dramatically as soiled litter is reused, thereby increasing the risk of health problems and disease in the birds.

Figure 2:
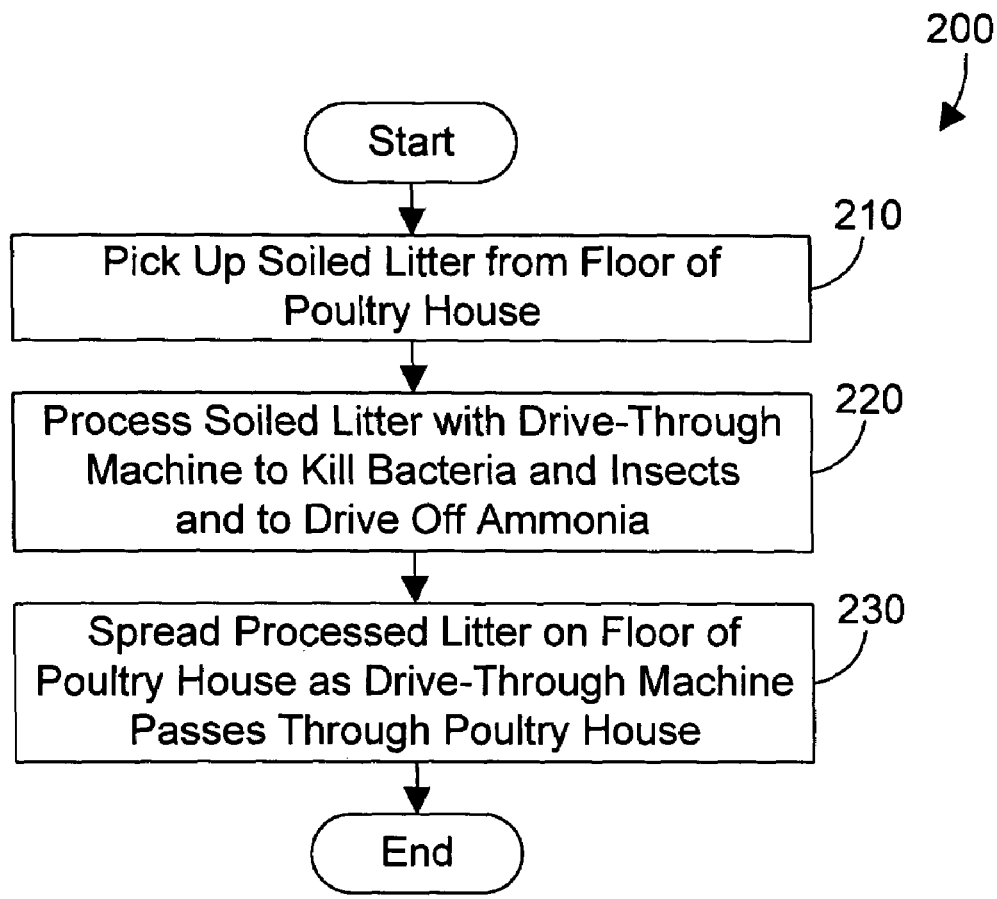
FIG. 2 is a flow diagram of a method in accordance with the preferred embodiments for processing soiled litter and spreading the processed litter on the floor of the poultry house using a mobile machine that passes through the poultry house.

The preferred embodiments recognize that there are significant problems with the prior art, and addresses a number of these problems by processing and reusing soiled litter using a machine (or apparatus) that is mobile, that processes the soiled litter, and that spreads the processed litter as it moves through the poultry house. Referring to FIG. 2, method 200 in accordance with the preferred embodiments includes the steps of picking up the soiled litter from the floor of the poultry house (step 210), processing the soiled litter with a drive-through machine to kill bacteria and insects and to drive off (i.e., eliminate) ammonia (step 220), and spreading the processed litter on the floor of the poultry house as the drive-through machine passes through the poultry house (step 230). Note that the term "drive-through machine" as used herein does not necessarily denote that the machine or apparatus of the preferred embodiments must be self-propelled. The apparatus of the preferred embodiments could be an implement that is pulled through a poultry house using a tractor or other suitable vehicle.

By processing the soiled litter to kill bacteria and insects and to eliminate ammonia in step 220, the litter is effectively "sanitized". As a result, the problem of disposing of the litter by spreading on farm land is significantly reduced, because the soiled litter can be reused without disposing of it. In addition, the problems with ammonia buildup and insect infestation are minimized because the process in step 220 burns off some or all of the ammonia that is present, kills the bacteria that generates ammonia, and kills all darkling beetles, other insects, larvae, and eggs in the litter. As a result, the processed litter that is spread on the poultry house floor in step 230 is actually more sanitary than new litter, which is typically clean, but may contain bacteria and/or insects and/or other contaminants.

The temperature required to kill bacteria and insects may vary according to the type of bacteria and insects present in the animal waste. It is believed that temperatures of 132° C. to 160° C. will kill bacteria and insects that are a concern in poultry applications. For this reason, the minimum temperature when heating the soiled litter for the preferred embodiments is suitably 132° C., preferably 145° C., and most preferably 160° C.

Figure 3:
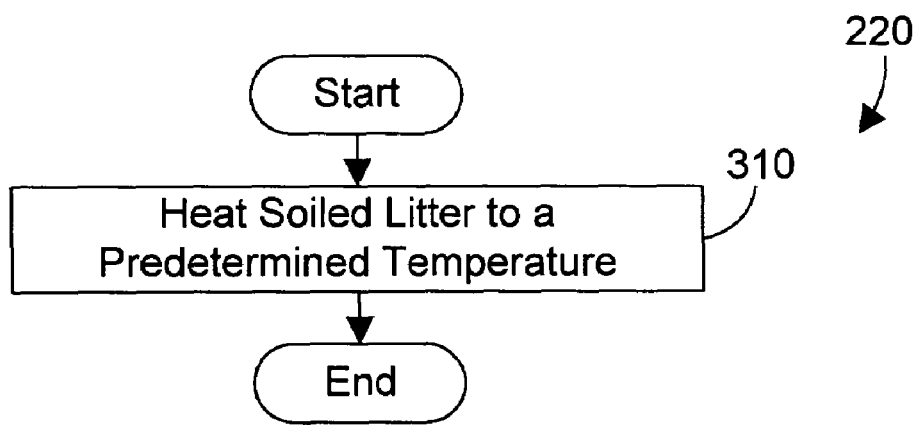
FIG. 3 is a flow diagram of a specific step that may be performed in step 220 of FIG. 2 in accordance with the preferred embodiments.

Referring to FIG. 3, one suitable way to process the soiled litter in step 220 of FIG. 2 includes the step of heating the soiled litter to a predetermined temperature (step 310). Note that this predetermined temperature may be selected to accommodate the time parameters for processing the soiled litter. For example, a relatively high temperature could be selected if the soiled litter is only kept at the selected temperature for a short period of time, while a lower temperature could be selected if the soiled litter is kept at the selected temperature for a longer period of time. The heating of the soiled litter in step 310 reduces the moisture content of the litter, driving off the ammonia in the soiled litter. In addition, the heating in step 310 also kills bacteria, darkling beetles, and other pests that may be present in the soiled litter.

Note that the heating of by the processing mechanism 820 may be accomplished using any suitable heating mechanism. For example, a propane tank could be included on the apparatus with propane burners included in the processing mechanism 820 to heat the litter. However, heating the litter with fuel would be relatively expensive. As a result, other less-expensive methods for heating the soiled litter are preferred, and are discussed below in reference to FIGS. 5A and 5B.

Figure 4:
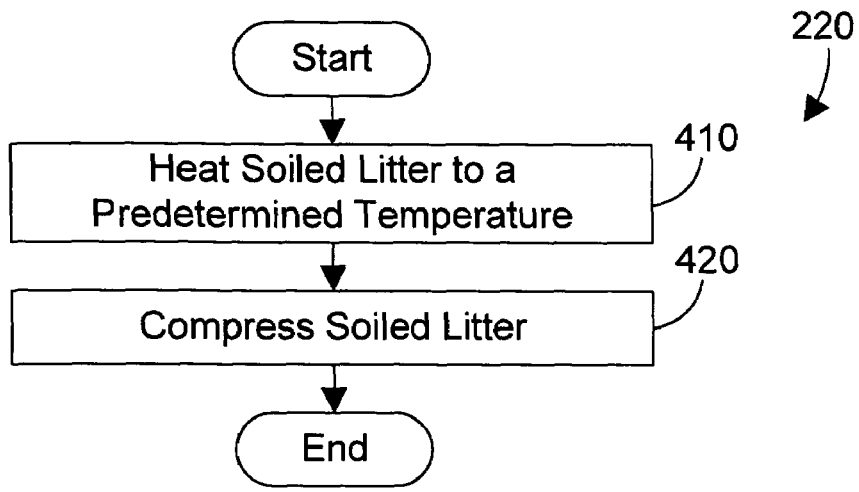
FIG. 4 is a flow diagram of specific steps that may be performed in step 220 of FIG. 2 in accordance with the preferred embodiments.

Referring to FIG. 4, another suitable way to process the soiled litter in step 220 of FIG. 2 is to heat the soiled litter to a predetermined temperature (step 410) and compress the litter (step 420). Compressing the soiled litter in step 420 reduces its volume, thereby compacting the litter.

Figure 5A:
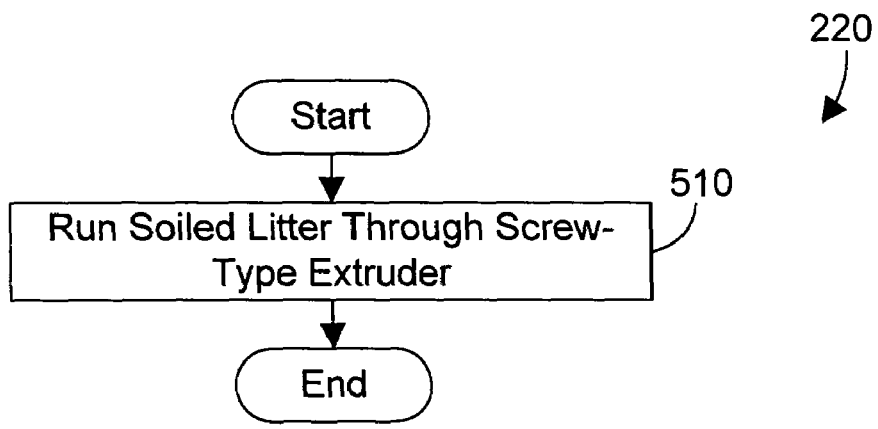
FIG. 5A is a flow diagram of a specific step that may be performed in step 220 of FIG. 2 in accordance with the preferred embodiments.

Referring to FIG. 5A, the heating and compressing of the soiled litter in FIG. 4 may be accomplished simultaneously by running the soiled litter through a screw-type extruder (step 510). Screw-type extruders are known in animal husbandry for producing food and feed products. Examples of suitable screw-type extruders are dry extruders manufactured and marketed by Insta-Pro International, 10104 Douglas Avenue, Des Moines, Iowa 50322. Some known screw-type extruders may be transported on a trailer to a location for use on-site. Once the extruder arrives to the desired location, it is set up in a stationary manner. Material to be processed is then loaded into a top hopper, and the discharge of the processed material from the extruder is typically loaded into a truck for hauling to where the processed material is needed. No prior art screw-type extruder is intended to be used when the extruder itself is mobile, i.e., as the extruder moves.

The term "screw-type extruder" is used herein to include any apparatus with an auger (screw) that has blades that decrease in distance apart along the direction of travel for the product being processed. In the art of processing food and feed, these extruders are known as dry extruders that are capable of cooking, sterilizing, and dehydrating a wide range of products. A screw-type extruder typically has no source of heat. The product being processed is heated by friction. As the product passes down the length of the auger, it is compressed by the auger blades that are increasingly close together. This creates both pressure and heat. The resulting product is cooked, sterilized, and dried by running the product through the extruder. Screw-type extruders have been used in the food and feed field to generate high-quality food products and animal feed. Of course, it is within the scope of the preferred embodiments to also include a source of heat to a screw-type extruder to increase the amount of moisture that could be removed or to increase the rate of feeding product through the extruder.

Figure 6:
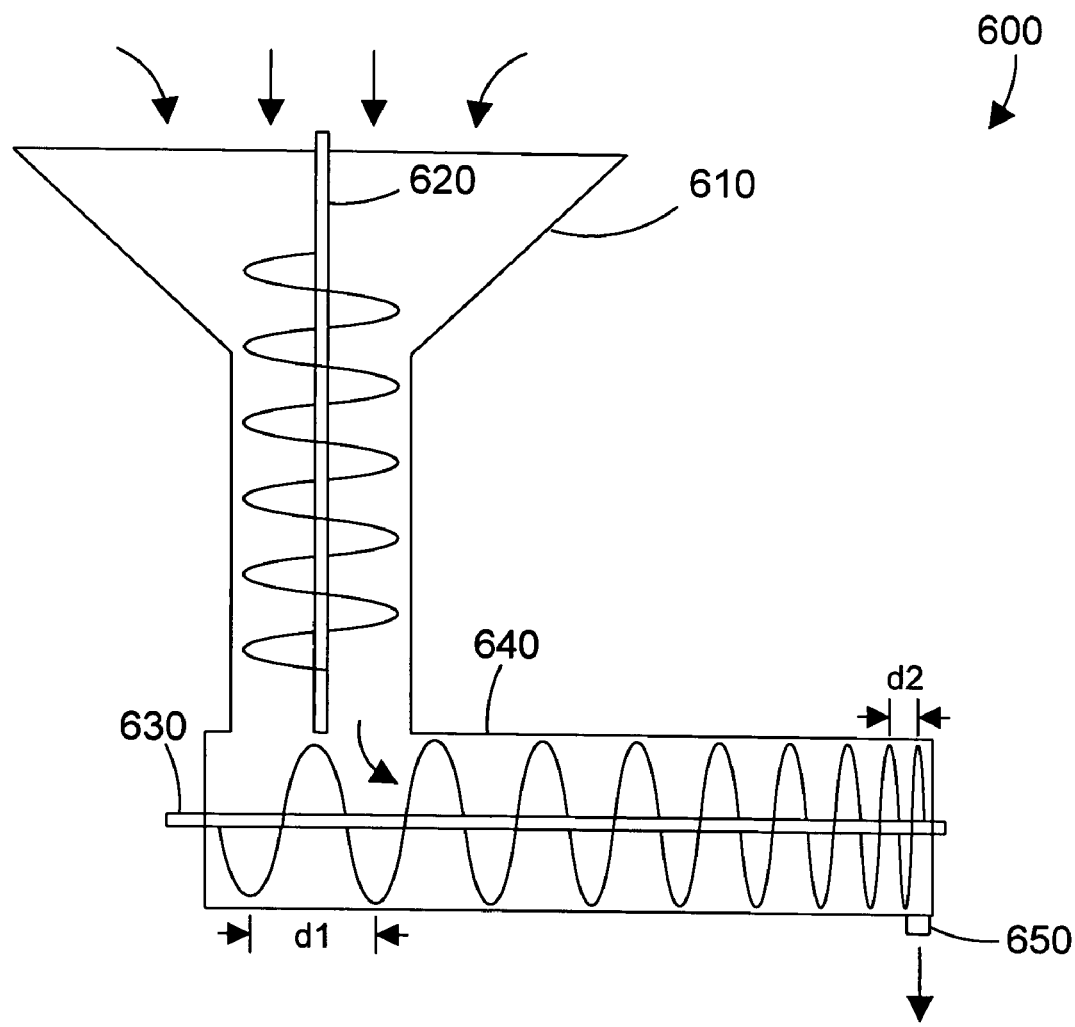
FIG. 6 is a cross-sectional view of a screw-type extruder that may be used to process the soiled litter in accordance with the preferred embodiments.

The function of a screw-type extruder 600 is represented graphically in FIG. 6. Product is initially introduced into a hopper 610. A first auger 620 rotates, which moves product being processed from the hopper 610 to a second auger 630. Auger 630 rotates, thereby pushing the product being processed into a constricted area 640, where the product is trapped between the blades of the auger. Note that auger 630 has blades that are increasingly closer together along the path of travel of the product. For example, as shown in FIG. 1, the auger blades at the front of auger 630 are a distance d1 apart, while the blades at the end of auger 630 are a distance d2 apart that is much smaller than d1. As the product passes down the constricted area 640, it is compressed by the decreasing distance between auger blades, and is heated by friction with the walls of constricted area 640 and by friction with the auger blades. The result is that the product may be "cooked" in a very short time, because the heat and pressure combine to remove moisture and reduce the volume of the product being processed as the product travels through extruder 600. At the end of constricted area 640 is a discharge port 650 where the finished product comes out of the extruder.

The sales literature of Insta-Pro International states that an Insta-Pro dry extruder typically takes less than 30 seconds to cook and dehydrate the product, and the resulting heat of 140° C. to 160° C. sterilize the product. In addition, a screw-type extruder is a continuous-feed machine, allowing unprocessed material to be placed in the hopper as the machine discharges processed product out the discharge port. For this reason, a screw-type extruder may be efficiently used to process animal waste in an apparatus as taught herein.

The Insta-Pro International sales literature also states that the moisture content of the product needs to be in the range of 20-26% (possibly up to 30%). If the animal waste to be processed has an excessively higher moisture content, it may be mixed with a dry ingredient (such as clean litter) to reduce the moisture content to a suitable level. If the animal waste to be processed has an excessively low moisture content, water or other forms of moisture may be added as needed.

One significant advantage to processing the soiled litter using a screw-type extruder is that the litter leaving the extruder is hot. As a result, the warm litter that is spread on the floor of a poultry house after extruding helps to heat the poultry house for the next flock. This will result in energy savings to the poultry farmer by requiring less energy to heat the poultry house in preparation for a flock.

Figure 5B:
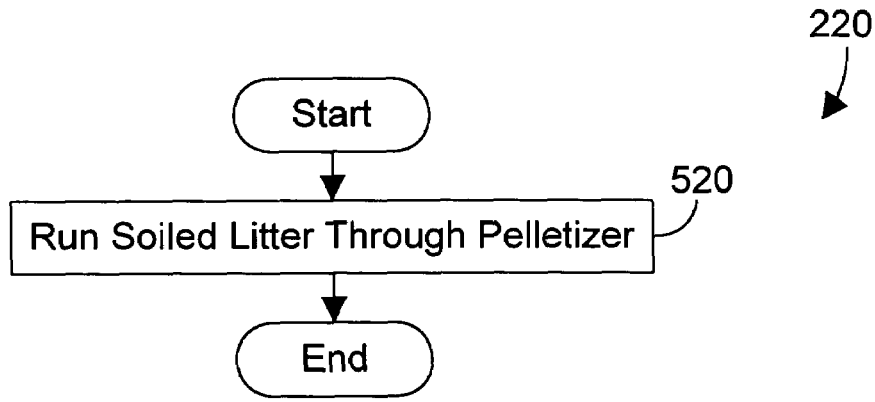
FIG. 5B is a flow diagram of a specific step that may be performed in step 220 of FIG. 2 in accordance with the preferred embodiments.

Referring to FIG. 5B, the heating and compressing of the soiled litter in FIG. 4 may be accomplished simultaneously by running the soiled litter through a pelletizer machine (step 520). Pelletizers are known in the art, and heat and compress the material being processed. One pelletizer in the art is disclosed in U.S. Pat. No. 5,195,465, which discloses a stationary pelletizer that may process soiled litter for reuse. Such a pelletizer could be used as the processing mechanism 820 in accordance with the preferred embodiments, assuming the pelletizer could function properly while moving.

Figure 7:
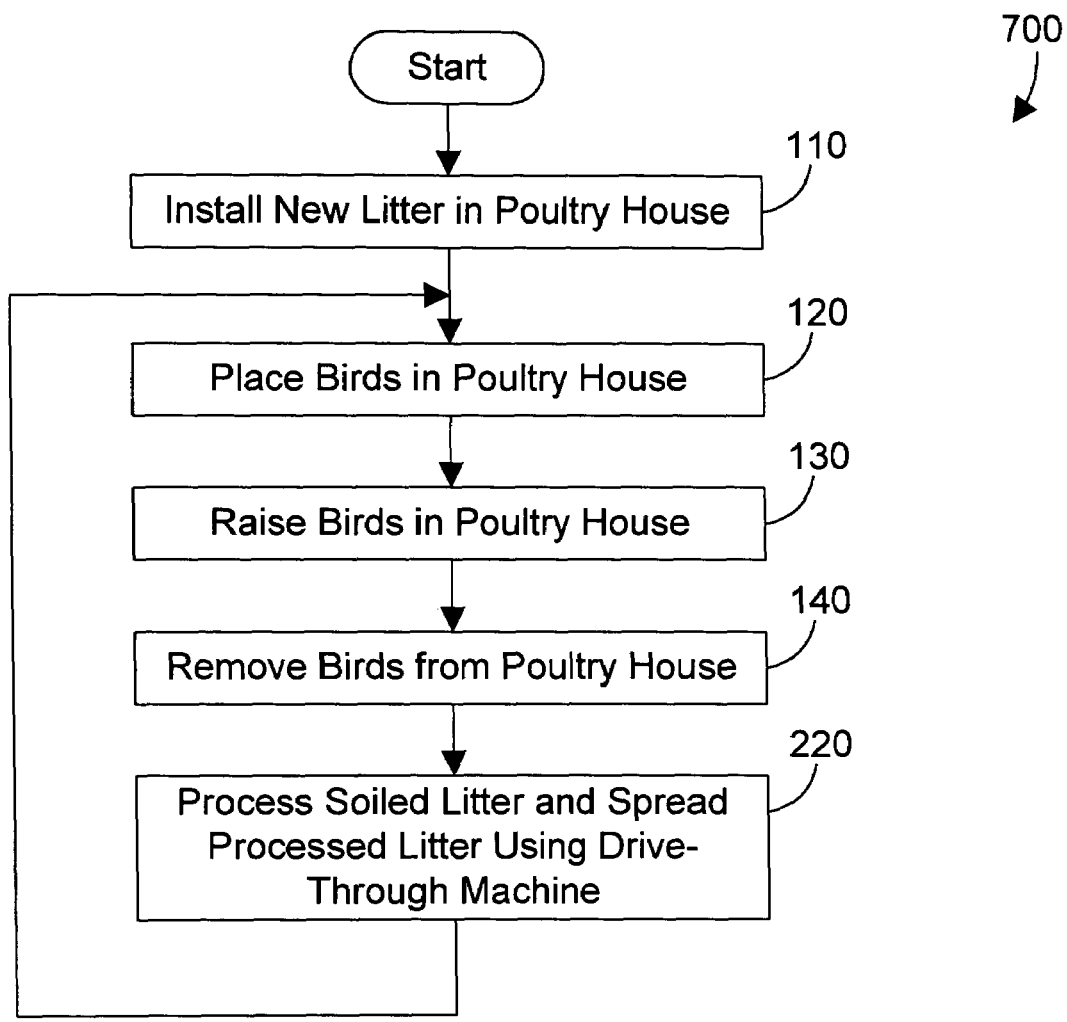
FIG. 7 is a flow diagram of a method in accordance with the preferred embodiments for operating a commercial poultry farm.

The processing of soiled litter in accordance with the preferred embodiments gives rise to a new method 700 for raising poultry, as shown in FIG. 7. Steps 110, 120, 130 and 140 are identical to the steps of the same number in the prior art method, shown in FIG. 1 and discussed above. After the birds are removed from the poultry house (step 140), a drive-through apparatus is used to process the soiled litter in the poultry house and spread the soiled litter onto the floor of the poultry house (step 220). In the most preferred implementation, the apparatus processes substantially all of the soiled litter and spreads processed, sanitized litter over the entire floor of the poultry house in a single pass. Note that examples of processing in step 220 within the scope of the preferred embodiments are shown in FIGS. 3-5 as discussed above. Processing the soiled litter in step 220 sanitizes the litter by killing the bacteria and insects present in the soiled litter, and by burning off the ammonia. Because the processed litter is sanitized, it can then be reused by spreading the processed litter on the floor of the poultry house for the next flock.

One significant advantage of method 700 when compared with the prior art is that most of the "down time" for poultry houses to reduce ammonia levels is eliminated. By removing the soiled litter, sanitizing the soiled litter, and returning the sanitized litter to the poultry house for the next flock of birds, the ammonia, ammonia-producing bacteria, and insects (including darkling beetles) are eliminated in the litter. As a result, the one to two week down time for tilling litter (step 170) and heating the poultry house to burn out ammonia (step 180) is reduced to only a day or two. This reduced turn-around time between flocks can significantly increase the throughput (or productivity) of a poultry farm, and may thereby significantly enhance profits for the poultry farmer. In addition, the reduction of ammonia results in less required air exchange in the poultry house, providing considerable savings in energy costs. Furthermore, decreased ammonia levels increase the efficiency of converting feed to body weight in the birds, resulting in lower feed consumption per pound of body weight. The combination of decreased turnaround time between flocks, reduced litter disposal requirements, no need to heat the poultry house to burn off ammonia, reduced air exchange requirements, and more efficient feed conversion make the methods of doing business in accordance with the preferred embodiments significantly more profitable than the prior art method 100 shown in FIG. 1.

Figure 8:
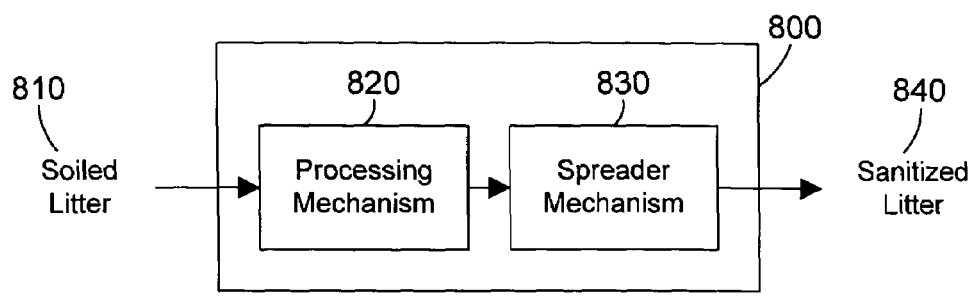
FIG. 8 is a block diagram showing the processing of soiled litter using the apparatus and methods in accordance with a first embodiment.

Referring now to FIG. 8, an apparatus 800 in accordance with a first embodiment includes a processing mechanism 820 and a spreader mechanism 830. Soiled litter 810 is received by the processing mechanism 820, which heats the soiled litter to a predetermined temperature. The processed (i.e., sanitized) litter is passed to the spreader mechanism 830, which then spreads the sanitized litter 840 onto the floor of the poultry house. In the most preferred implementation, spreader mechanism 830 spreads the sanitized litter 840 across the entire width of the poultry house in a single pass. Note, however, that spreader mechanism 830 expressly extends to any spreader mechanism that spreads the sanitized litter 840 to a width of at least 1.2 meters.

Figure 9:
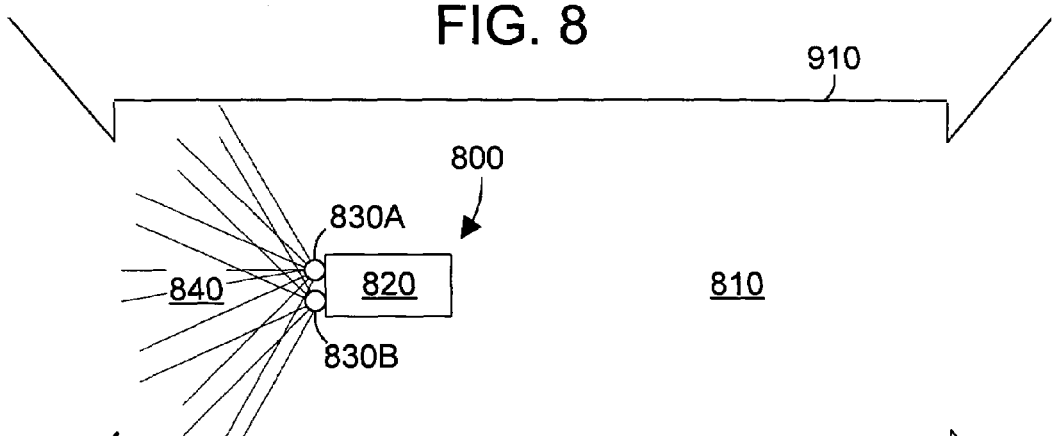
FIG. 9 is a top outline view of a poultry house showing the processing of soiled litter and the spreading of processed litter within the poultry house in accordance with the first embodiment when a dual rotary broadcast spreader is used.

An overhead outline view of a poultry house 910 and the apparatus 800 is shown in FIG. 9. Soiled litter 810 is on the floor of the poultry house 910. The apparatus 800 is mobile. As apparatus 800 is moved through the poultry house 910, the soiled litter 810 is transported to the processing mechanism 820. The processing mechanism 820 heats the soiled litter to a predetermined temperature to sanitize the soiled litter. The sanitized litter is then sent to the spreader mechanism 830. Spreader mechanism 830 in FIG. 9 comprises two rotary broadcast-type spreaders 830A and 830B that are well-known in the art for spreading lime on farmland and for spreading new litter in poultry houses. The sanitized litter 840 is thus distributed by the spreaders 830A and 830B onto the floor of the poultry house.

Note that the transporting of the soiled litter 810 to the processing mechanism 820 may be performed using one or more machines that are separate from apparatus 800, or using a pickup mechanism that is part of apparatus 800. In the first case, the apparatus 800 includes a hopper (similar to hopper 610 shown in FIG. 6) that directs material to the processing mechanism, and a tractor or bobcat with a front-end loader is used to load the soiled litter 810 into the hopper of the processing mechanism 820. The apparatus 800 is then moved along the length of the poultry house, processing the soiled litter and spreading the sanitized litter as it moves. In the second case, the soiled litter 810 is transported by the processing mechanism 820 using a pickup mechanism that is part of the apparatus 800. This case is described in more detail below with reference to FIGS. 11-17.

Figure 10:
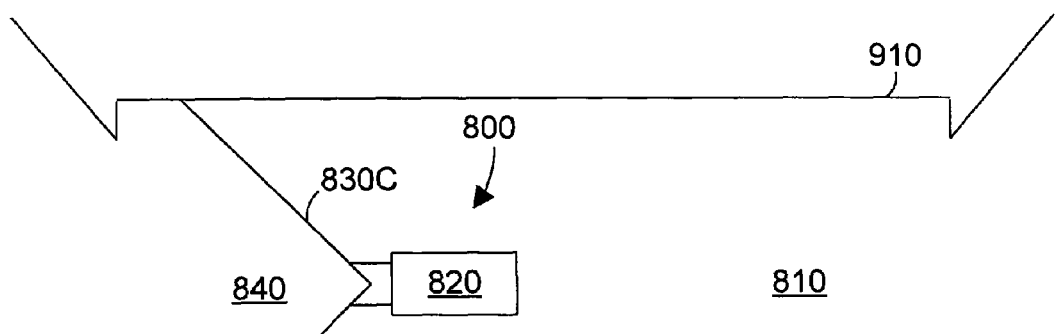
FIG. 10 is a top outline view of a poultry house showing the processing of soiled litter and the spreading of processed litter within the poultry house in accordance with the first embodiment when a V-blade spreader is used.

Another example of a suitable spreader mechanism 830 is shown in FIG. 10. The spreader mechanism 830C in FIG. 10 is a V-shaped scraper blade. Sanitized litter is discharged from the processing mechanism 820, and the V-shaped scraper blade 830C moves the litter along the length of its two blades, which are at a preset distance above the poultry house floor. As the sanitized litter is moved along the V-shaped scraper blade 830C, it falls into the gap between the blades and the floor, thereby distributing the litter in an even thickness along the poultry house floor. Note that the blades of the V-shaped scraper blade 830C are preferably movable to allow easily folding the blades together to allow for easy transport and for easily deploying the blades to their V position once the apparatus 800 is moved inside a poultry house.

Figure 11:
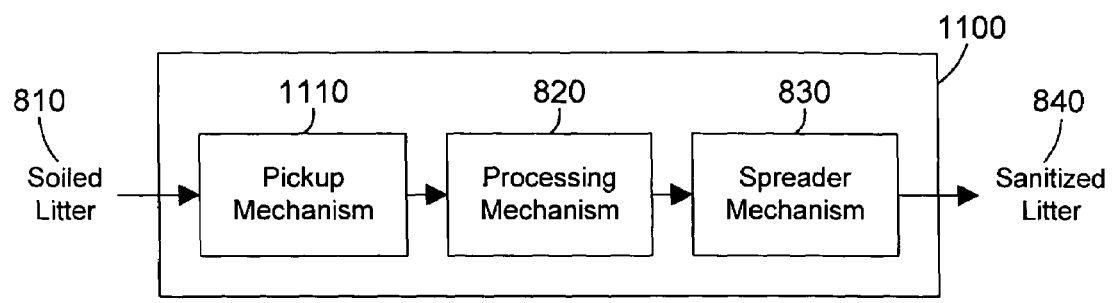
FIG. 11 is a block diagram showing the processing of soiled litter using the apparatus and methods in accordance with a second embodiment.
Figure 12:
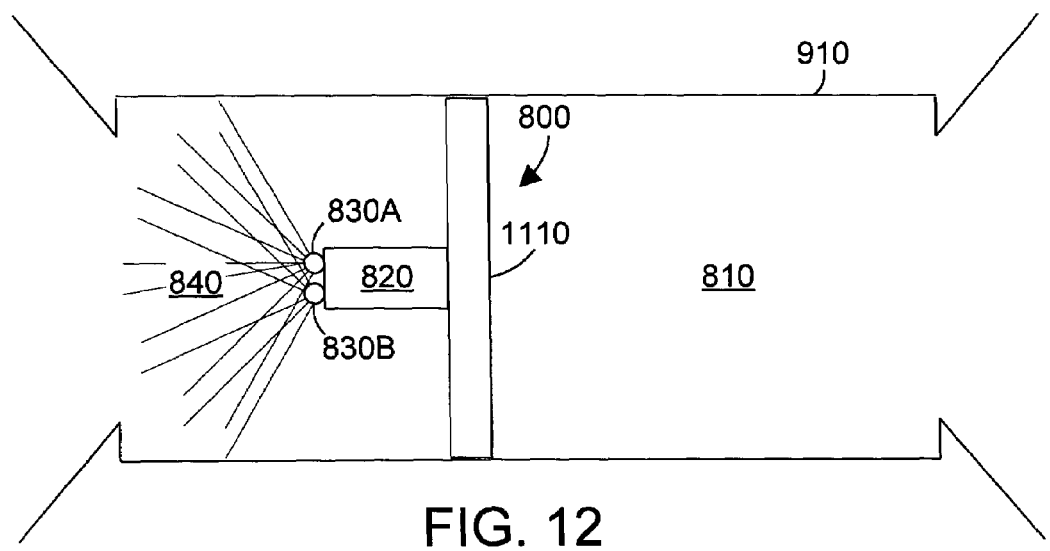
FIG. 12 is a top outline view of a poultry house showing the processing of soiled litter and the spreading of processed litter within the poultry house in accordance with the second embodiment that includes a pickup mechanism.

Referring now to FIG. 11, an apparatus 1100 in accordance with a second embodiment includes all of the features of apparatus 800 in FIG. 8, and additionally includes a pickup mechanism 1110 that picks up the soiled litter 810 from the floor of a poultry house and that transports the soiled litter to an input of the processing mechanism 820. The pickup mechanism 1110 may pick up soiled litter in a path that is less than the width of the poultry house 910, but in the most preferred implementation of the second embodiment, the pickup mechanism 1110 extends the entire width of the poultry house 910, as shown in FIG. 12. In this manner the apparatus 1100 can be used to process and sanitize all of the litter in a poultry house in a single pass.

The pickup mechanism 1110 includes any suitable device, machine, mechanism or method for transporting soiled litter 810 from the floor of the poultry house 910 to the processing mechanism 820. Some examples of suitable pickup mechanisms are shown in FIGS. 13-17. Note, however, that the pickup mechanisms in FIGS. 13-17 are simply examples in accordance with the preferred embodiments, and are not limiting of the claims herein.

Figure 13:
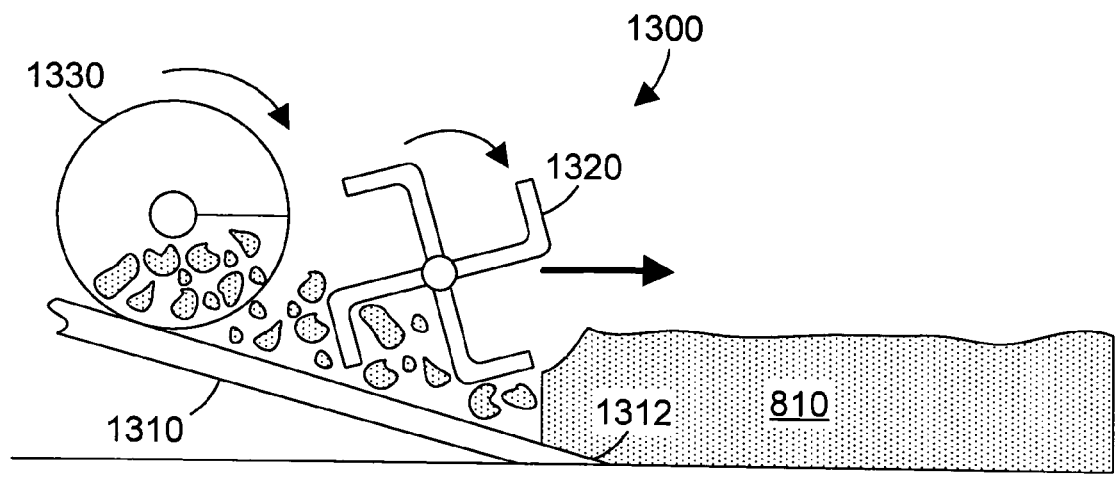
FIG. 13 is a cross-sectional view of a first suitable pickup mechanism in accordance with the second embodiment.

A first pickup mechanism 1300 within the scope of the preferred embodiments is shown in FIG. 13. Pickup mechanism 1300 includes a blade portion 1310 that has a leading edge 1312 positioned to scrape the floor of the poultry house. As the apparatus is moved along in the poultry house, the blade portion 1310 directs the soiled litter 810 to a tiller blade 1320, which breaks the soiled litter into small pieces. The tiller blade 1320 directs the small pieces of litter to an auger 1330. The auger 1330 then transports the small pieces of the soiled litter to the input of the processing mechanism 820.

Figure 14:
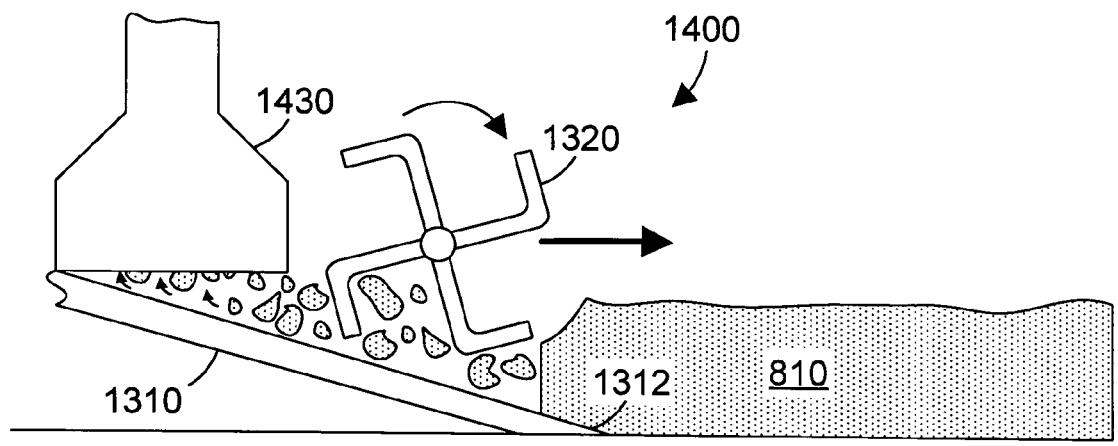
FIG. 14 is a cross-sectional view of a second suitable pickup mechanism in accordance with the second embodiment.

A second pickup mechanism 1400 within the scope of the preferred embodiments is shown in FIG. 14. Pickup mechanism 1400 includes the blade portion 1310 with its leading edge 1312, and the tiller blade 1320 shown in FIG. 13. Note, however, that the auger 1330 in FIG. 13 has been replaced by a vacuum mechanism 1430 in FIG. 14. The small pieces of soiled litter are thus transported from the tiller blade 1320 to an input of the vacuum mechanism 1430, which sucks up the soiled litter and transports the soiled litter to an input of the processing mechanism 820.

Figure 15:
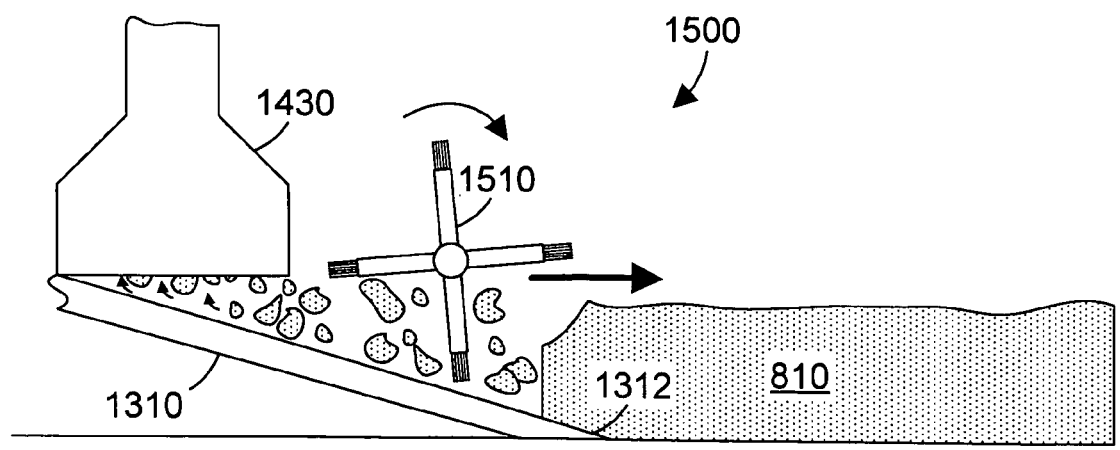
FIG. 15 is a cross-sectional view of a third suitable pickup mechanism in accordance with the second embodiment.

A third pickup mechanism 1500 within the scope of the preferred embodiments is shown in FIG. 15. This configuration is similar to the pickup mechanism 1400 shown in FIG. 14, with the exception that the tiller blade 1320 in FIG. 14 has been replaced by a rotary broom mechanism 1150. The rotary broom mechanism 1510 includes a plurality of arms with bristles on the end, thereby providing a sweeping action to transport the soiled litter 810 to the input of the vacuum mechanism 1430.

Figure 16:
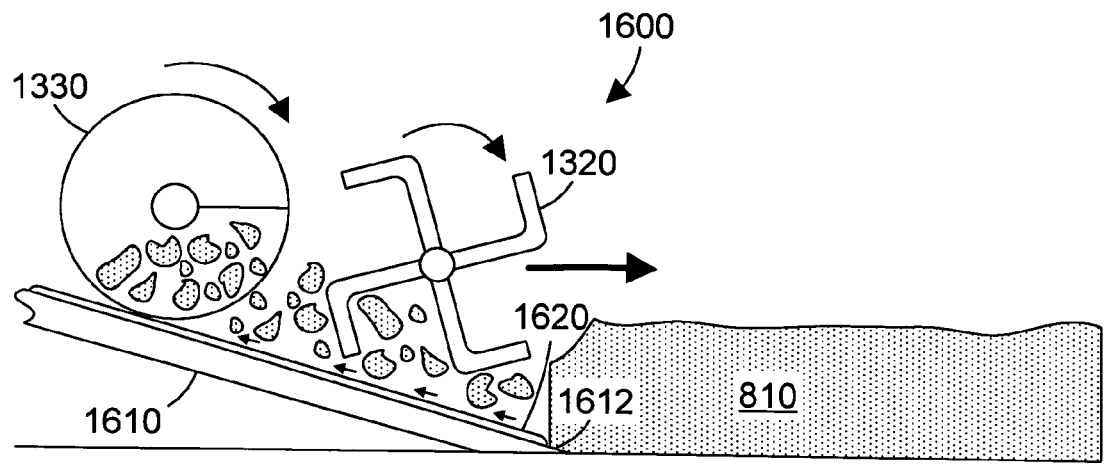
FIG. 16 is a cross-sectional view a fourth suitable pickup mechanism in accordance with the second embodiment.

A fourth pickup mechanism 1600 within the scope of the preferred embodiments is shown in FIG. 16. Note that pickup mechanism 1600 includes the tiller blade 1320 and the auger 1330 shown in FIG. 13. Pickup mechanism 1600 additionally includes a blade portion 1610 with a scraper edge 1612, with a conveyor belt 1620 to convey the soiled litter to the auger 1330.

Figure 17:
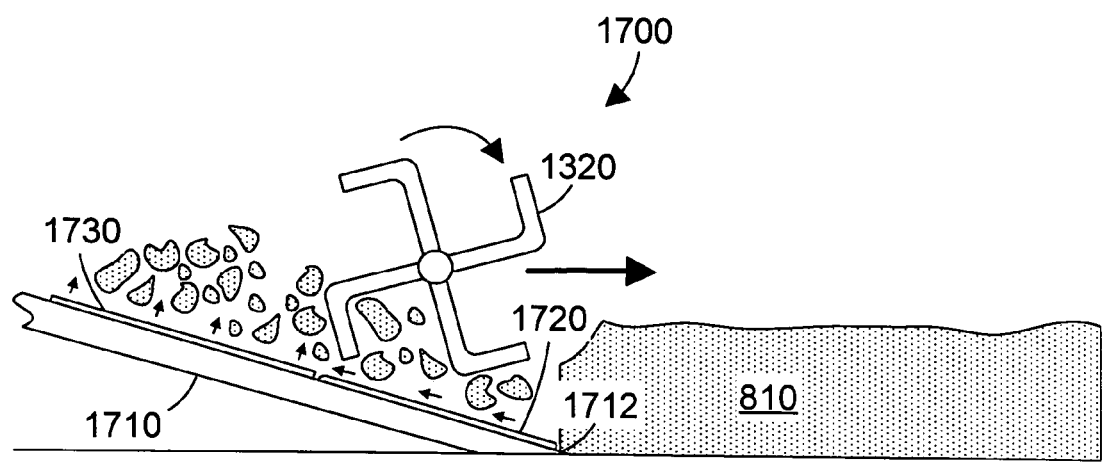
FIG. 17 is a cross-sectional view of a fifth suitable pickup mechanism in accordance with the second embodiment.

A fifth pickup mechanism 1700 within the scope of the preferred embodiments is shown in FIG. 17. Pickup mechanism 1700 includes a blade portion 1710 that includes a scraper edge 1712 and two separate conveyor belts 1720 and 1730. The conveyor 1720 transports the soiled litter past the tiller blade 1320 to the second conveyor 1730, which then conveys the litter away (in a direction into the page) to the input of the processing mechanism 820.

Note that the various features of the pickup mechanisms shown in FIGS. 13-17 may be mixed and matched as desired. Thus, an auger 1330 could be used with a rotary broom 1510. A conveyor 1620 could be used with a vacuum mechanism 1430. The pickup mechanism 1110 of the preferred embodiments expressly extend to any and all mechanisms that are part of the apparatus 1100 to transport the soiled litter 810 to the input of the processing mechanism 820.

The spreader mechanism 830, in addition to its possible configurations discussed above, could also have a configuration similar to the pickup mechanisms discussed in FIGS. 13-17. Thus, the spreader mechanism 830 could span the entire width of the poultry house, just as the pickup mechanism 1110 does. The spreader mechanism 830 could include one or more augers, one or more conveyor belts, etc. to create a relatively even distribution of sanitized litter on the poultry house floor.

Figure 18:
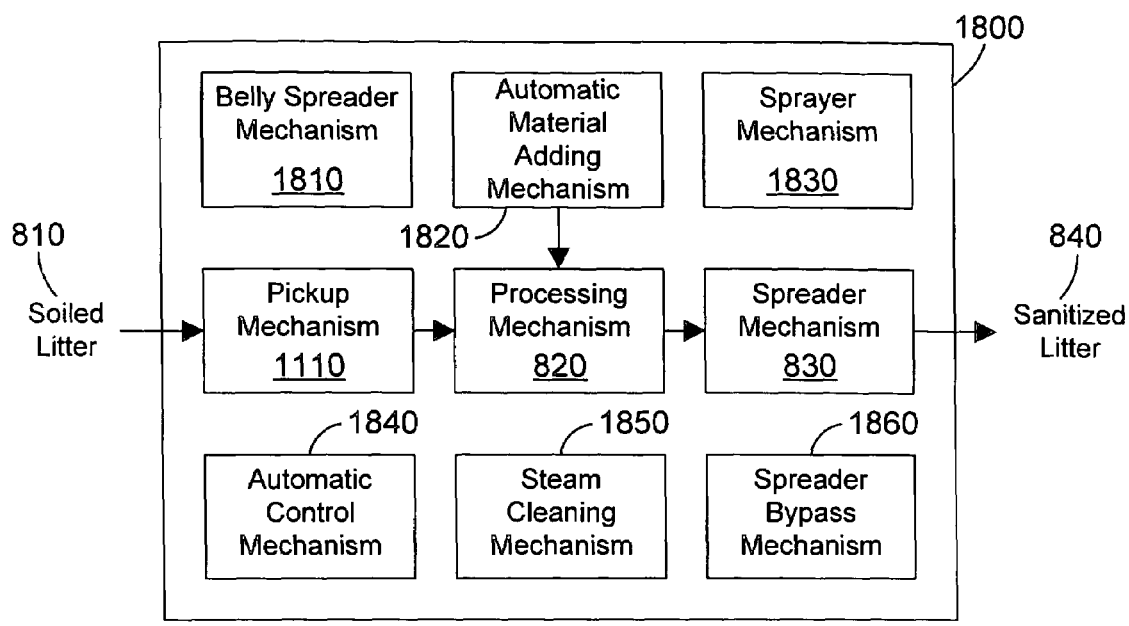
FIG. 18 is a block diagram showing the processing of soiled litter using the apparatus and methods in accordance with a third embodiment.

An apparatus in accordance with the third embodiment is shown in FIG. 18. Apparatus 1800 includes the pickup mechanism 1100, processing mechanism 820, and spreader mechanism 830 shown in FIG. 11. Apparatus 1800 additionally includes a belly spreader mechanism 1810, an automatic material adding mechanism 1820, a sprayer mechanism 1830, an automatic control mechanism 1840, a steam cleaning mechanism 1850, and a spreader bypass mechanism 1860. The belly spreader mechanism 1810 is any suitable spreader for spreading dry material. In the most preferred implementation, belly spreader mechanism 1810 is located on the underside (belly) of the processing apparatus 1800, and spreads dry material directly on the floor of the poultry house after the soiled litter is picked up by the pickup mechanism 1110 and before the spreader mechanism 830 spreads the sanitized litter 840. The belly spreader mechanism 1810 could spread any desired dry product on the floor of the poultry house. Examples of dry products that could be spread by the belly spreader mechanism 1810 include lime, salt, sand, sawdust, and diatomaceous earth.

Figure 19:
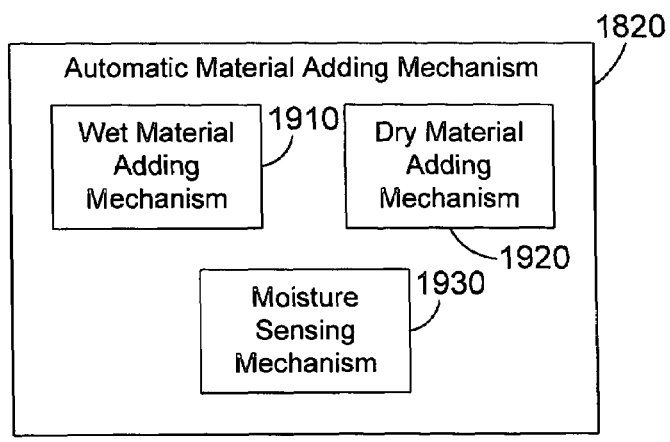
FIG. 19 is a block diagram showing suitable components of the automatic material adding mechanism in FIG. 18.

The automatic material adding mechanism 1820 is included to maintain a proper moisture content in the soiled litter to assure proper processing by the processing mechanism 820. Details of the automatic material adding mechanism 1820 are shown in FIG. 19. The automatic material adding mechanism 1820 preferably includes a wet material adding mechanism 1910, a dry material adding mechanism 1920, and a moisture sensing mechanism 1930. The moisture sensing mechanism 1930 senses the moisture content of the soiled litter 810 as it enters the processing mechanism 820. If the moisture content of the soiled litter 810 is too low, the wet material adding mechanism 1910 is activated to add wet material to the soiled litter. If the moisture content of the soiled litter 810 is too high, the dry material adding mechanism 1920 is activated to add dry material to the soiled litter. The wet material adding mechanism 1910 preferably includes a tank that is filled with suitable wet material, such as water, liquid hatchery waste, etc. The dry adding mechanism 1920 preferably includes a hopper that is filled with suitable dry material, such as sawdust, wood chips, rice hulls, sand, and shredded newspaper. The automatic material adding mechanism 1820 monitors the moisture content of the soiled litter 810, and makes appropriate additions, if needed, to keep the moisture content within a desired range.

Figure 20:
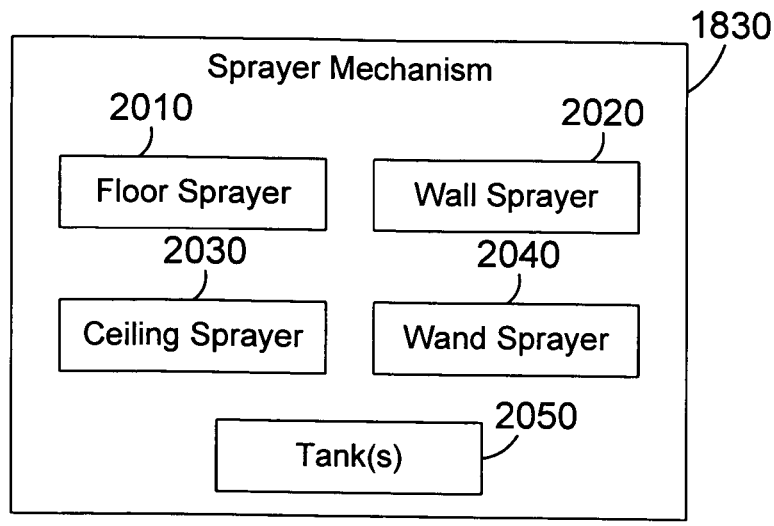
FIG. 20 is a block diagram showing suitable components of the sprayer mechanism shown in FIG. 18.

The sprayer mechanism 1830 may include various different sprayers in different positions that accomplish different things. Details of sprayer mechanism 1830 within the scope of the preferred embodiments are shown in FIG. 20. Sprayer mechanism 1830 includes one or more tanks 2050 that contain suitable liquids to be sprayed. Sprayer mechanism 1830 may include any or all of a floor sprayer 2010, a wall sprayer 2020, a ceiling sprayer 2030, and a wand sprayer 2040. The various sprayers 2010, 2020, 2030 and 2040 may be low-pressure sprayers, or may be high-pressure sprayers. The floor sprayer 2010 is positioned to spray liquid towards the floor. In one specific implementation, if the soiled litter 810 is too dry, a front boom sprayer (one form of floor sprayer 2010) could be positioned ahead of the pickup mechanism 1110 to spray water on the soiled litter 810. In another specific implementation, a belly boom sprayer (another form of floor sprayer 2010) could be positioned behind the pickup mechanism 1110 and in front of the spreader mechanism 830. A belly boom sprayer would be ideal for spraying the bare floor of the poultry house with disinfectant, insecticide, or deodorizer before spreading the processed litter onto the floor. A rear boom sprayer (another form of floor sprayer 2010) could also be used to spray a suitable liquid (such as insect repellent or deodorizer) onto the sanitized litter 840 after it is spread.

A wall sprayer 2020 may include a left wall sprayer and a right wall sprayer. Wall sprayer 2020 may spray any suitable liquid on one or more walls of the poultry house. Suitable liquids include water, cleaning solution, disinfectant, insecticide, and deodorizer.

Ceiling sprayer 2030 is positioned to spray the ceiling of the poultry house. Ceiling sprayer 2030 may spray any suitable liquid onto any portion of the ceiling of the poultry house. Suitable liquids include water, cleaning solution, disinfectant, insecticide, and deodorizer.

Wand sprayer 2040 is a hand-held wand, similar to those used in self-serve car washes. Wand sprayer 2040 may be used by a person walking alongside the apparatus 1830 as the apparatus 1830 processes soiled litter and spreads the soiled litter onto the floor of the poultry house. Wand sprayer 2040 may spray any suitable liquid onto any surface of the poultry house that the user decides to spray. Suitable liquids include water, cleaning solution, disinfectant, insecticide, and deodorizer.

Figure 21:
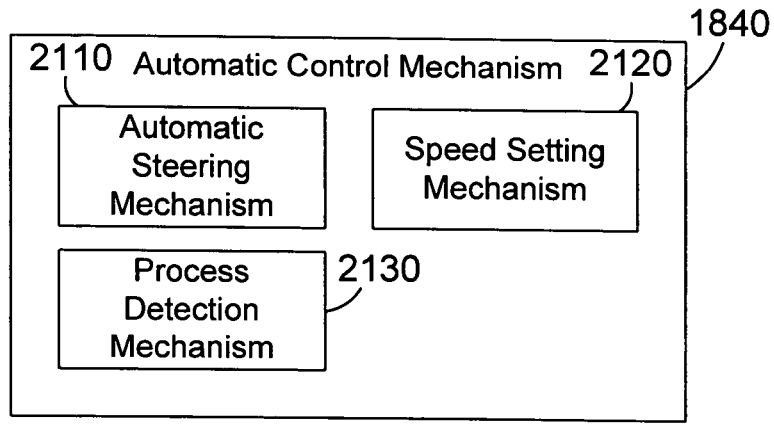
FIG. 21 is a block diagram showing suitable components of the automatic control mechanism shown in FIG. 18.

Automatic control mechanism 1840 includes features that allow the apparatus 1800 to more efficiently process the soiled litter 810. Details of automatic control mechanism 1840 are shown in FIG. 21. The automatic control mechanism 1840 preferably includes an automatic steering mechanism 2110, a speed setting mechanism 2120, and a process detection mechanism 2130. The automatic steering mechanism 2110 allows the apparatus 1800 to be self-propelled and self-guiding. Automatic steering mechanism 2110 uses one or more sensors to steer the apparatus 1800. Suitable sensors include contact switches on the sides of the pickup mechanism 1110, or laser sensors the measure the distance to one or both walls of the poultry house.

Automatic control mechanism 1840 also includes a process detection mechanism 2130. The process detection mechanism 2130 monitors the temperature of the processing mechanism 820, and uses the speed setting mechanism 2120 to vary the speed of the self-propelled apparatus 1800. Thus, if the temperature of the processing mechanism 820 changes toward an unacceptable temperature, the automatic control mechanism 2130 can cause the speed setting mechanism 2120 to speed up or slow down the apparatus 1800 so the proper temperature may be maintained.

Figure 22:
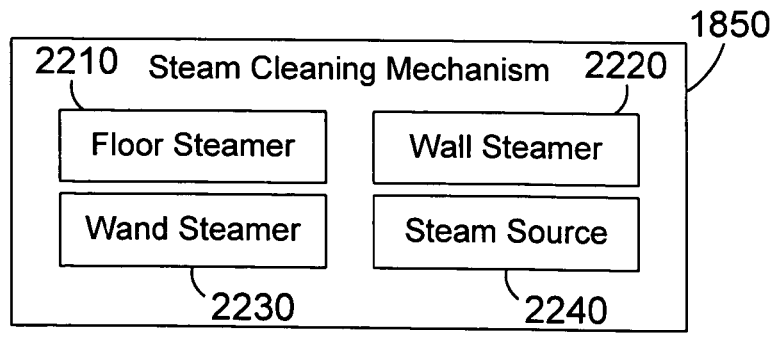
FIG. 22 is a block diagram showing suitable components of the steam cleaning mechanism shown in FIG. 18.
Figure 23:
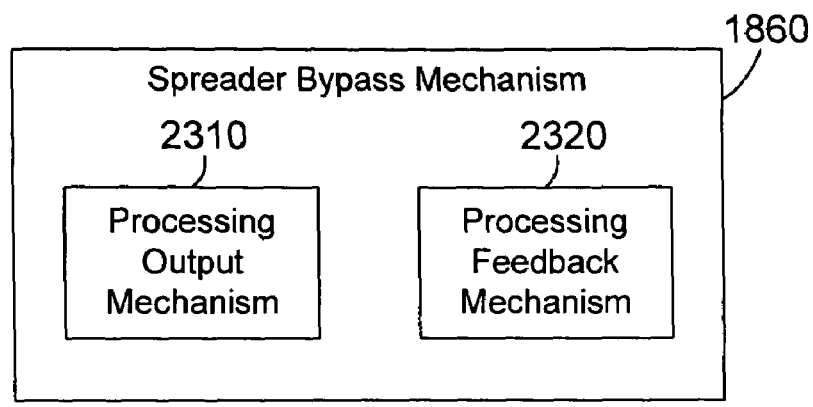
FIG. 23 is a block diagram showing suitable components of the spreader bypass mechanism shown in FIG. 18.

Steam cleaning mechanism 1850 is provided to allow cleaning the poultry house as the apparatus 1800 processed the soiled litter 810. Details of steam cleaning mechanism 1850 are shown in FIG. 22. Steam cleaning mechanism 1850 may include any or all of a floor steamer 2220, a wall steamer 2220, and a wand steamer 2230, and also includes a steam source 2240. Because the processing mechanism 820 generates significant heat, it is possible to provide a steam source 2240 at little expense. For example, if the processing mechanism is a screw-type extruder 600 as shown in FIG. 6, metal tubing could be wrapped around the outside of the constricted area 640, which typically reaches temperatures of 132° C. to 160° C. Water pumped through this tubing would be heated to steam, which could then be used as the steam source 2240 for steam cleaning mechanism 1850.

Floor steamer 2210 is preferably a belly-mounted steamer that takes steam from the steam source 2240 and steam cleans the poultry house floor after the soiled litter is picked up by the pickup mechanism 1110 and before the sanitized litter is spread by the spreader mechanism 830. The wall steamer 2220 comprises one or more steam nozzles directed at one or both walls of the poultry house. Wand steamer 2230 includes a hand-held wand, similar to those used at self-serve car washes, which allows an operator to walk alongside the apparatus 1800 as it processes litter and steam clean anything the operator desires to clean.

Note that the sprayer mechanism 1830 and the steam cleaning mechanism 1850 could be performed by many common pieces in the apparatus. For example, a belly boom could be a floor steamer 2210 when coupled to the steam source 2240, or could be a floor sprayer 2010 when coupled to an appropriate tank 2050. The wand sprayer 2040 could also be the wand steamer 2230 by directing whether the wand is supplied with liquid from a tank 2050 or with steam from the steam source 2240.

The spreader bypass mechanism 1860 provides a way to divert the output of the processing mechanism 820 so it does not reach the spreader mechanism 830. This is useful when the apparatus first arrives on-site and is not heated up sufficiently to process the soiled litter. The spreader bypass mechanism 1860 is needed at the very beginning of a poultry house, when the pickup mechanism 1110 is picking up soiled litter and the processing mechanism 820 is processing the soiled litter even before the spreader mechanism 830 is inside of the poultry house. Until the apparatus is sufficiently warmed up, the processed litter coming out of the processing mechanism 820 will not be fully sanitized. For this reason, the spreader bypass mechanism allows a way to bypass the spreader mechanism 830 so this litter may be re-processed.

The spreader bypass mechanism 1860 includes a processing output mechanism 2310 and a processing feedback mechanism 2320. The processing output mechanism 2310 provides the processed litter directly from the processing mechanism 820, without passing to the spreader mechanism 830, as shown by arrow 2410 in FIG. 24. Thus, the litter that comes out of the apparatus before the apparatus is completely warmed up could be put in a pile behind the apparatus with the processing output mechanism 2310. This pile of litter could be picked up with a front-end loader and placed into the input of the processing mechanism 820 when the pickup mechanism 1110 leaves the poultry house 910, but before the spreader mechanism 830 leaves the poultry house 910.

Figure 24:
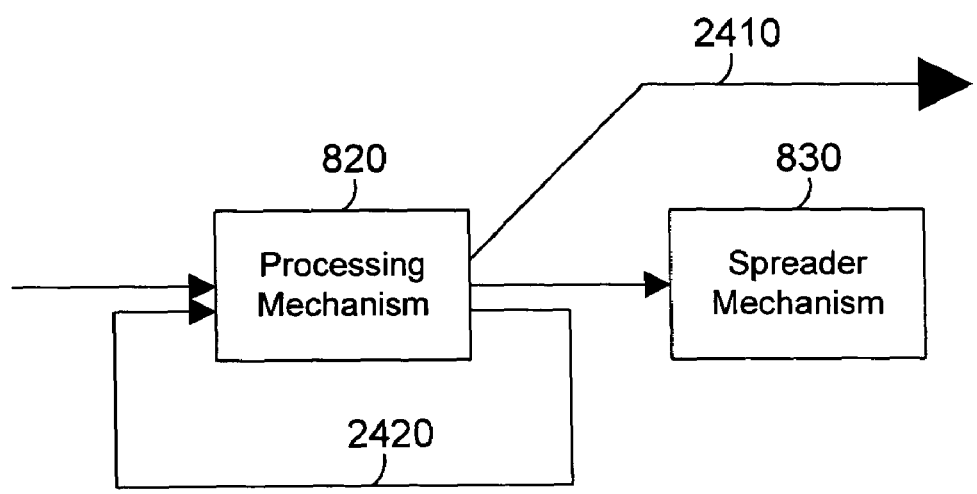
FIG. 24 is a block diagram showing how the spreader bypass mechanism in FIGS. 18 and 23 bypasses the spreader mechanism.

In the alternative, the processing feedback mechanism 2320 could include an internal gate within the processing mechanism 820 that diverts the output of the processing mechanism back to the input of the processing mechanism 820, as shown by arrow 2420 in FIG. 24. This configuration allows the same litter to be repeatedly run through the processing mechanism 820 until the processing mechanism 820 is warmed up to the desired temperature. Because the litter coming out of the processing mechanism 820 is heated, running this heated litter back through the processing mechanism 820 will preheat the processing mechanism 820 to the desired temperature in a relatively short period of time.

The preferred embodiments cover a wide range of machines that process animal waste. In a simple example, a relatively small machine does not have a pickup mechanism, and is not self-propelled. As this machine is pulled through a poultry house using a tractor, front-end loaders may be used to scoop up the soiled litter into a hopper that is an input to the processing mechanism. The machine then spreads the sanitized litter behind it.

In a more sophisticated example, a large machine is self-propelled, and includes all of the features shown in FIG. 18. In addition, the machine could include other features that allow for more easily deploying the pickup mechanism and the spreader mechanism. For example, hydraulics could be included that rotate the pickup mechanism from a position parallel to the processing apparatus to a position in front of and perpendicular to the processing apparatus. Extension portions of the pickup mechanism could be deployed via hydraulic control until the extension portions are in a desired proximity to the side walls. Wall scrapers could be included as part of the pickup mechanism to scrape off any soiled litter that adheres to the wall. Hydraulics could also be used to deploy one or more blades that are part of the spreader mechanism 830, such as shown in FIG. 10.

In a fully automated example, the operator drives a large self-propelled machine until the pickup mechanism is placed at the beginning of the poultry house. With the push of a button, the pickup mechanism could be fully deployed to cover the entire width of the poultry house. Processing could then begin, with the processing feedback mechanism 2320 feeding the output of the processing mechanism back to its input until the processing mechanism has reached its desired operating temperature. At this point the processing feedback mechanism 2320 is disabled so the output of the processing mechanism 820 passes directly to the spreader mechanism 830. As the self-propelled, self-steering machine passes through the poultry house, the operator may walk alongside the machine, using a wand to spray a desired liquid or to steam-clean any part of the poultry house that needs cleaning. A belly sprayer could spray disinfectant on the bare floor, while a belly spreader could broadcast diatomaceous earth to kill insects.

In the case of a self-propelled machine that is driven by an operator, a cab could be provided on the machine to protect the operator from the harmful ammonia fumes and unpleasant smell that results from processing the soiled litter. The cab preferably includes equipment to maintain the quality of air inside the cab. One way to maintain good air quality uses an air filter to filter undesirable fumes and odor from air that is circulated in the cab. Another way to maintain good air quality is to provide a bottle of compressed air or oxygen on the apparatus that has an input into the cab area. By creating a flow of air or oxygen from the bottle into the cab area, the higher pressure in the cab causes an outflow of air or oxygen from the cab, which prevents undesirable fumes or odors from entering the cab.

The apparatus disclosed herein compresses the soiled litter, which greatly reduces its volume. However, there will usually be some amount of litter left over that needs to be disposed of in some way. Because the litter is sanitized using the apparatus, the sanitized litter does not have the high concentrations of ammonia that unprocessed litter has. As a result, the options for disposing of the extra sanitized litter are greater than those for disposing of unprocessed litter.

Litter furnaces are known in the art. However, their acceptance in poultry farming has been limited. Due to air quality concerns, the EPA limits the amount of litter that can be burned in a litter furnace. The allowable amount is typically so small that a litter furnace can only dispose of a small fraction of the soiled litter that is generated on a typical poultry farm. As a result, poultry farmers have been hesitant to install litter furnaces because of their limited benefit. However, a litter furnace could be used to dispose of any extra processed litter that results after processing the litter in a poultry house using the apparatus described herein. Because the extra processed litter would be a small amount compared to the total amount of processed litter, it is likely that a poultry farmer could dispose of the extra litter using a litter furnace within the EPA guidelines. In addition, because the extra litter has been sanitized, it is likely that a greater quantity could be burned in the litter furnace without producing excessive emissions under EPA guidelines.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the discussion in this patent application specifically addresses poultry farming, and hence the processing of soiled poultry litter, the preferred embodiments are not limited to poultry farming, but expressly extend to the processing of any animal waste that includes urine and/or feces.

I claim:

1. A mobile apparatus comprising:
(A) a mechanism that allows the apparatus to move through a building as the apparatus processes animal waste;
(B) a pickup mechanism that continuously picks up the animal waste from the floor of the building as the apparatus moves through the building, the pickup mechanism spanning a full width of the building so the apparatus processes substantially all of the animal waste in the building in a single pass;
(C) a processing mechanism that receives the animal waste from the pickup mechanism, and heats the animal waste to at least a predetermined temperature sufficient to kill bacteria and insects in the animal waste, wherein the processing mechanism comprises a screw-type extruder;
(D) a spreader mechanism that receives processed animal waste from the processing mechanism, and that spreads the processed animal waste as the apparatus moves through the building, wherein the spreader mechanism comprises at least one rotary broadcast spreader that spreads the processed animal waste the frill width of the building as the apparatus moves through the building;

(E) an automatic material adding mechanism that senses moisture content of the animal waste and adds at least one liquid to the animal waste when the moisture content is lower than a desired moisture content range and adds a dry material to the animal waste when the moisture content is higher than the desired moisture content range;
(F) a belly spreader mechanism for spreading dry material on the floor of the building after the pickup mechanism picks up the animal waste and before the spreader mechanism spreads the processed animal waste;
(G) a sprayer mechanism for spraying at least one liquid as the apparatus moves through the building; and
(H) a steam cleaning mechanism for spraying steam as the apparatus moves through the building.

2. The apparatus of claim 1 wherein the sprayer mechanism comprises at least one of the following: floor sprayer, wall sprayer, ceiling sprayer, and wand sprayer.

3. The apparatus of claim 1 wherein the steam cleaning mechanism comprises at least one of the following: floor steamer, wall steamer and wand steamer.

4. The apparatus of claim 1 further comprising an automatic control mechanism that steers the apparatus, sets the speed of the apparatus, monitors temperature of the processing mechanism, and adjusts the speed of the apparatus to achieve temperature of the processing mechanism within a desired range.

* * * * *